United States Patent [19]
DeGeorge et al.

[11] Patent Number: 6,003,493
[45] Date of Patent: Dec. 21, 1999

[54] METHOD OF REDUCING VEHICLE COMPONENT LOADING VARIATIONS ON AN INTERNAL COMBUSTION ENGINE

[75] Inventors: John W. DeGeorge, Michigan Center; Howard W. Krausman, Dexter; Adam E. Pachana, Troy; Gang Chen, Rochester Hills, all of Mich.

[73] Assignee: Chrysler Corporation, Auburn Hills, Mich.

[21] Appl. No.: 09/167,676

[22] Filed: Oct. 7, 1998

[51] Int. Cl.$^6$ ........................................................ F02P 5/00
[52] U.S. Cl. .................................. 123/406.23; 123/406.24
[58] Field of Search ........................ 123/406.12, 406.19, 123/406.23, 406.24

[56] References Cited

U.S. PATENT DOCUMENTS

| | | |
|---|---|---|
| 4,582,032 | 4/1986 | Hara et al. .......................... 123/406.65 |
| 4,732,125 | 3/1988 | Takizawa .......................... 123/406.19 |
| 4,915,076 | 4/1990 | Takizawa .......................... 123/406.19 |
| 5,628,390 | 5/1997 | Richardson et al. . |
| 5,692,473 | 12/1997 | Thomas et al. . |

Primary Examiner—Erick R. Solis
Attorney, Agent, or Firm—Mark P. Calcaterra

[57] ABSTRACT

A method of reducing vehicle component loading variations on an internal combustion engine in a motor vehicle includes the step of receiving a request to actuate a vehicle component and modifying a spark timing sequence for each spark plug of the internal combustion engine. The method also includes the step of actuating said vehicle component. The method further includes opposing a vehicle component torque generated by said actuation of said vehicle component with an adjustment of the internal combustion engine torque by reverting said modification of said spark timing sequence of each spark plug of the internal combustion engine.

15 Claims, 7 Drawing Sheets

METHOD OF REDUCING VEHICLE COMPONENT LOADING VARIATIONS ON AN INTERNAL COMBUSTION ENGINE

BACKGROUND OF INVENTION

1. Field of the Invention

This invention relates generally to a control method for an engine in a motor vehicle and, more specifically to a method of adjusting the spark timing sequence for reducing loading variations on an internal combustion engine.

2. Discussion of the Related Art

One of the most notable examples of change in the automotive industry has been the improvement in the fuel efficiency of the internal combustion engine. This improvement was made possible, largely by the reduction in the size of the internal combustion engine. Although the reduction in the size of the internal combustion engine has created a benefit by increasing fuel efficiency, it has also created a problem.

The operation of an automotive air conditioning unit best illustrates this problem. The typical automotive air conditioning unit uses a compressor to perform the cooling function. When the air conditioning unit cycles power, the compressor creates a torque that opposes the torque generated by the internal combustion engine of a vehicle. This, in turn, causes a deceleration in the speed of the internal combustion engine. Typically a series of oscillations also follow as the engine controller tries to compensate for the initial deceleration. This loading variation problem was not readily noticed when large engines were predominant in vehicles, since the torque created by the compressor of the air conditioning unit was very small in comparison with the torque generated by a large engine. However the large engine is no longer the norm in todays automobile and the smaller engines, which are used in place of the larger engines, have a much smaller torque output so that the torque created by the air conditioning unit is a larger amount relative to the torque generated by the smaller engine. Thus deceleration and oscillations that are created by the air conditioning unit cycling power are more of a problem today since current vehicles are more likely to have smaller engines.

A number of methods have been attempted to correct the problem. In particular the size of the compressor has been reduced in order to lessen the effect of the torque created by the air conditioning unit. However, reducing the size of the compressor creates a undesirable reduction in the ability of the air conditioning unit to cool the vehicle. Another approach has been attempted such that half of the compressor actuates first and the other half of the compressor actuates some time after the first half of the compressor has started, thus lessening the overall torque effect of the cycling of power of the air conditioning unit on the internal combustion engine. However, due to the special design, the dual starting air conditioning unit costs more than a standard air conditioning unit and thus is not a viable solution for many automotive manufacturers.

Therefore, it would be desirable to provide a methodology for reducing the effect that a cycling of power of the automotive air conditioning unit has on the operation of the vehicle.

SUMMARY OF THE INVENTION

Therefore, it is an object of the subject invention to reduce the loading variation due to the cycling of power of a vehicle component, on the vehicle's internal combustion engine by modifying the spark timing sequence of each spark plug of the internal combustion engine.

It is another object of the subject invention to modify the spark timing sequence of each spark plug using predetermined values as limits so that an adjustment to the torque is made to the internal combustion engine that counteracts the torque created by the vehicle component during a cycling of power.

It is yet another object of the subject invention to provide an adaptive clutch method that takes into account individual differences in the actuation mechanisms thereby allowing the modification of the spark timing sequence to be more effective.

Finally, it is an object of the subject invention to provide a method that reduces the oscillations in the speed of the internal combustion engine after the vehicle component is actuated.

To achieve the foregoing objects, the present invention is a method of reducing loading variations, due to the cycling of power of a vehicle component, on the internal combustion engine by modifying the spark timing sequence of each spark plug of the internal combustion engine. The method includes steps of modifying the spark timing sequence of each spark plug of the internal combustion engine while using predetermined values as limits so that an adjustment to the torque of the internal combustion engine is made that counteracts the torque created by the vehicle component during a cycling of power. The method includes steps of utilizing an adaptive clutch method to provide for a more effective modification of the spark timing sequence. The method further includes the steps of reducing the oscillations in the speed of the internal combustion engine after the vehicle component is actuated.

Additional objects, advantages and features of the present invention will become apparent from the following description and appended claims, taken in conjunction with the accompanying drawings.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The following discussion of the preferred embodiments of the invention directed to a method of reducing vehicle component loading variations by adjusting the spark timing sequence on an internal combustion engine is merely exemplary in nature, and is in no way intended to limit the invention or its applications or uses. For example, the description of the vehicle component loading of the invention will be described in connection with an air conditioning unit mechanically connected to the powertrain of the engine. However, other types of vehicle components and connections may be utilized by the invention, such as a power steering unit.

Figure 1:
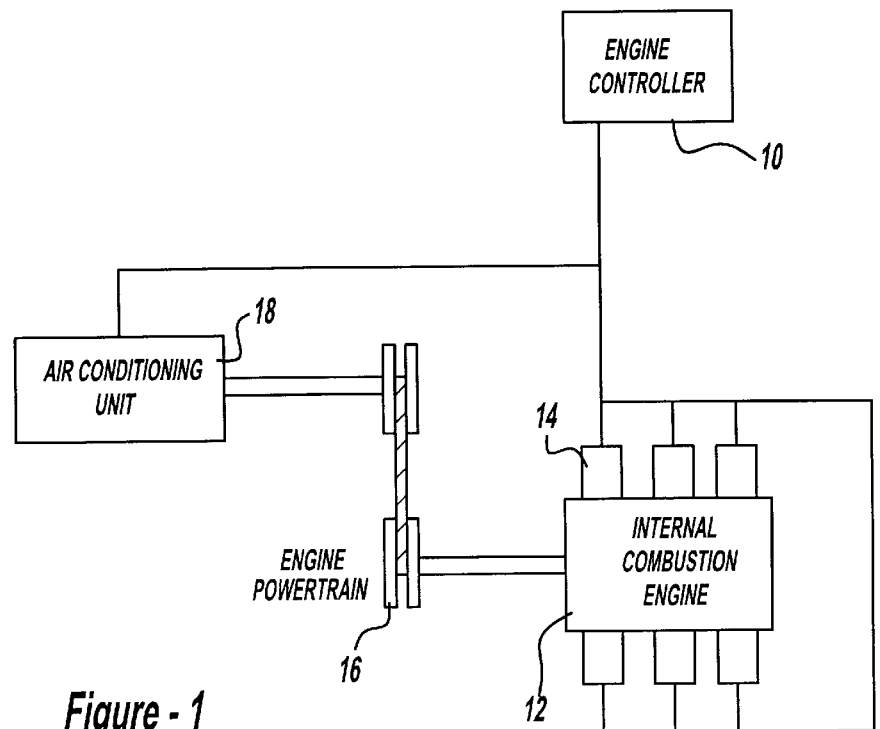
FIG. 1 is a block diagram illustrating the elements of an engine system that can be controlled with the methodology of the present invention.

Referring to FIG. 1, the elements controlled by the methodology of the present invention are shown. An engine controller 10 implements the methodology of the invention in the form of a software program. The engine controller 10 includes a microprocessor, memory, signal conditioning circuitry, and various other components (not shown but well known in the art) for use with the methodology of the invention. In the preferred embodiment the controller includes the software necessary for implementing the present invention. A plurality of spark plugs 14 of the internal combustion engine 12 have an spark timing sequence for initiating a power cycle that drives the engine powertrain 16. An air conditioning unit 18 is powered by the engine powertrain 16 by engaging a clutch to the engine powertrain 16. The engine controller 10 modifies the spark timing sequence, by combination of retarding and advancing the ignition time on each spark plug. A torque output, which is adjusted by a modified spark timing sequence, from the internal combustion engine 12 counteracts the torque loading on the engine powertrain 16 that is generated by the cycling of power of the air conditioning unit 18.

Figure 2:
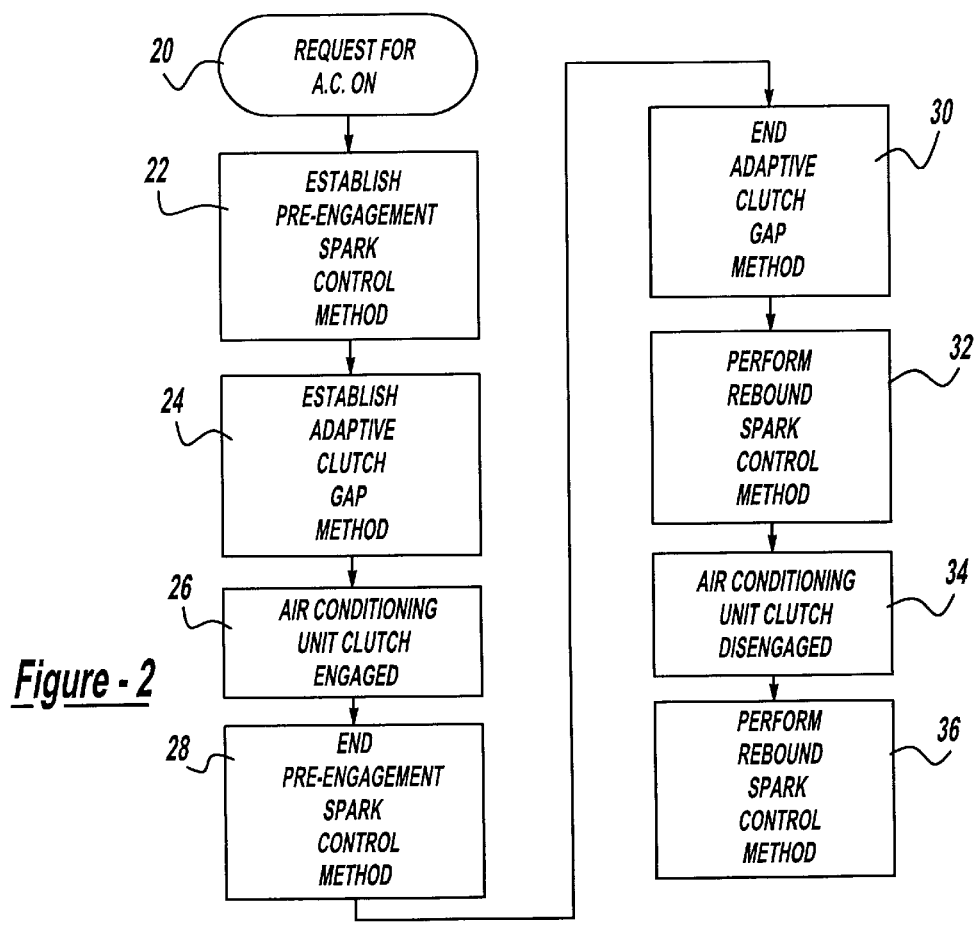
FIG. 2 is a flow chart illustrating the overall spark timing sequence adjustment methodology of the present invention.

FIG. 2 depicts the overall methodology of the present invention. The methodology starts in bubble 20 if there is a request to turn the air conditioning unit on. The next step 22 establishes a pre-engagement spark control method that modifies the spark timing sequence by adjusting the amount of spark retard of each spark plug based on predetermined data that is retrieved from a table of stored values. The pre-engagement spark control method also correlates the return of the spark retard amount to zero and, in some cases, momentarily advances the spark with the powering of the air conditioning unit.

The next step 24 establishes a adaptive clutch gap control method which modifies, based on historical data, the time at which the pre-engagement spark control method returns the spark retard amount to zero. In the next step 26 the air conditioning unit clutch is engaged to the engine powertrain 16. The next step 28 ends the pre-engagement spark control method. The next step 30 ends the adaptive clutch control method. In step 32, a rebound spark control method is performed by adjusting the spark timing sequence to smooth out the acceleration oscillations, for a predetermined amount of time. In step 34, the air conditioning unit clutch is disengaged as the air conditioning unit is turned off. In step 36, the rebound spark control is again utilized to smooth out any acceleration perturbations resulting from the air conditioning unit being disengaged.

Figure 3A:
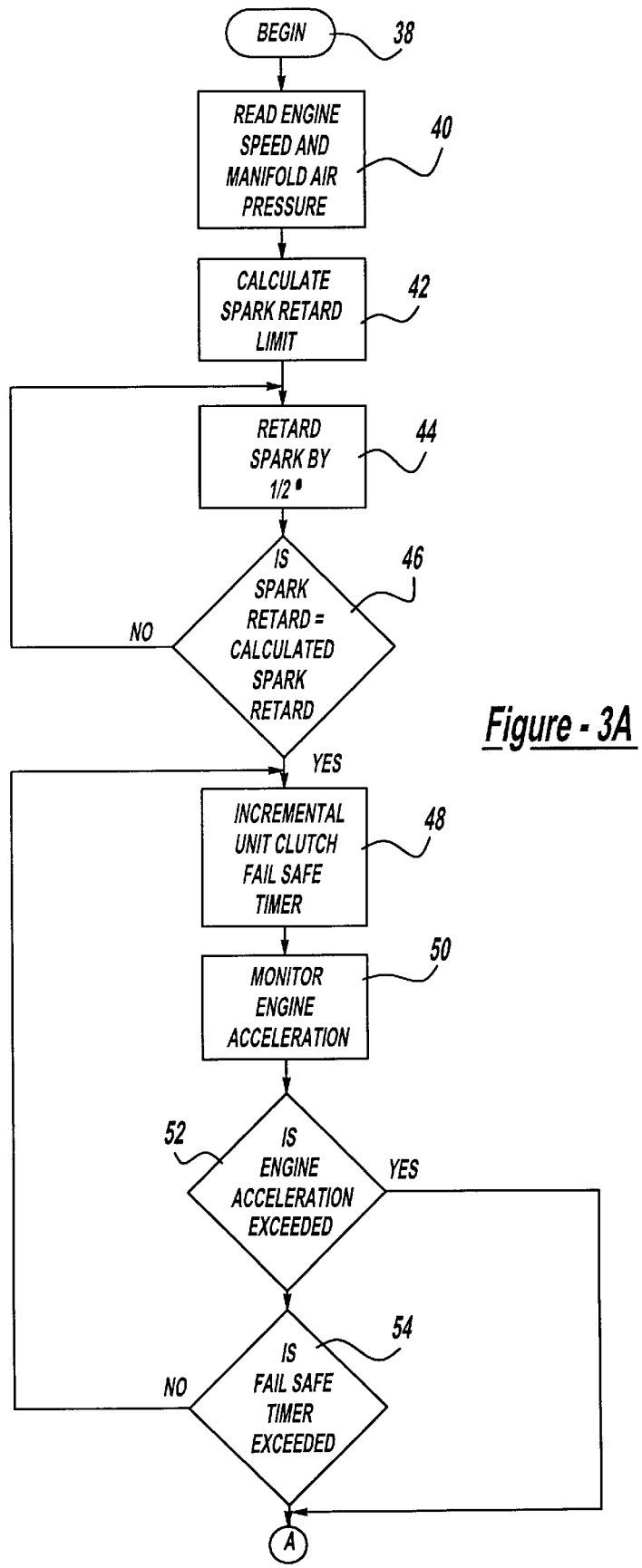
FIGS. 3a, 3b and 3c are flow charts illustrating a preferred embodiment of the pre-engagement spark retard methodology of the present invention.
Figure 3B:
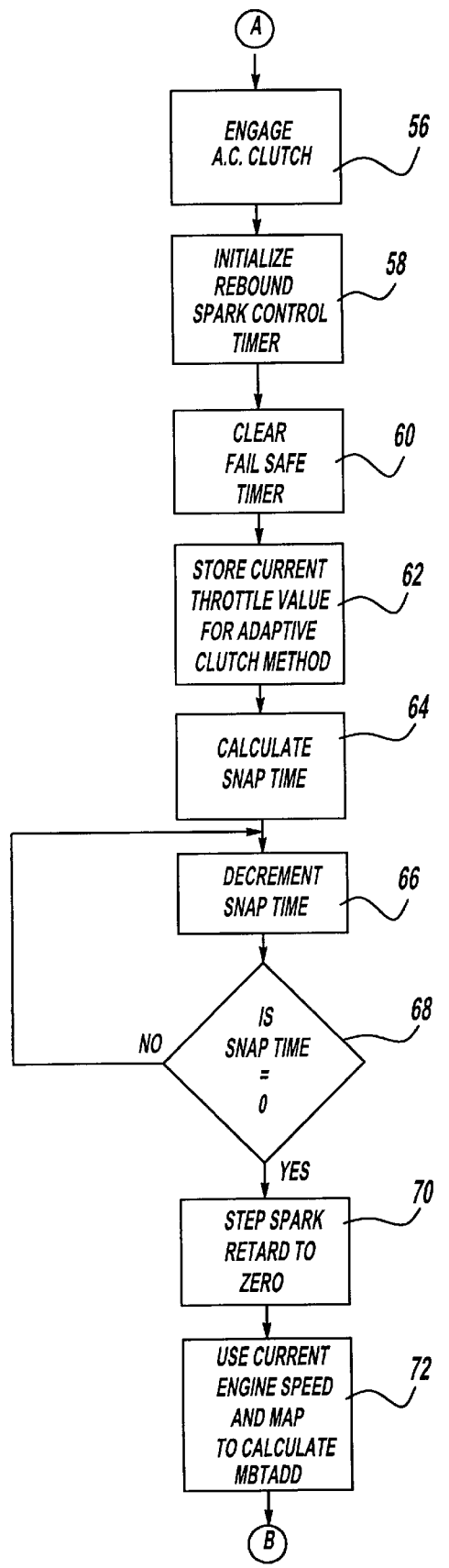
Figure 3C:
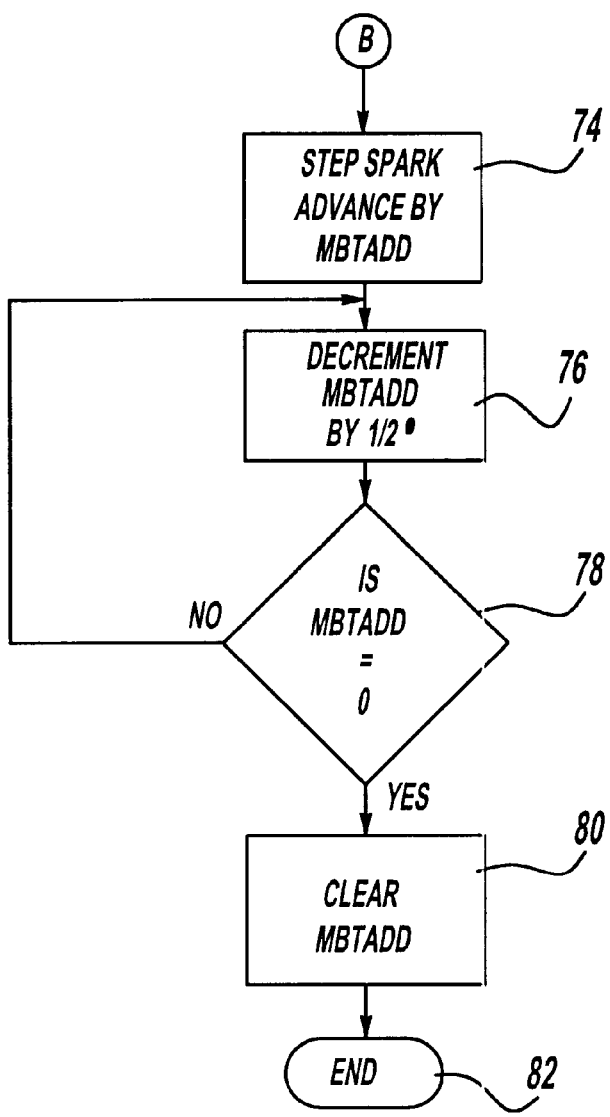

FIGS. 3a, 3b and 3c are flow charts illustrating a method of the pre-engagement methodology. The method starts at bubble 38 and establishes whether the air conditioning unit requests to be on. Next, in block 40, the method determines the engine speed and manifold air pressure. The manifold air pressure is read from a transducer in the preferred embodiment. In an alternative embodiment the manifold air pressure is interpolated from engine speed. Next, in block 42, the method calculates a spark retard limit. The method calculates the spark retard limit by obtaining the amount of pre-engagement spark retard form a table of stored values where the amount of spark retard is stored as a function of engine speed and manifold air pressure based on engine test data. The spark retard limit represents a predetermined amount that creates a corresponding reduction in the torque output of the engine.

In block 44, the method retards the spark timing by a ½°. In decision block 46 the method determines if the spark retard limit is equal to the calculated spark retard limit. If it is not, the method goes back to block 44 to increment the spark timing retard. If the actual spark retard limit is equal to the calculated spark retard limit then the method proceeds to block 48, to increment an air conditioning unit clutch fail safe timer.

In block 50, the method monitors engine acceleration. In decision block 52 the method determines if the engine acceleration has exceeded a predetermined level. If the engine acceleration has exceeded a predetermined level then the method goes to block 56. If the engine acceleration has not exceeded a predetermined level then the method goes to the decision block 54. In decision block 54 the method compares the air conditioning fail safe timer to a limit. If the air conditioning fail safe timer has exceeded the limit then the method goes to block 56. The purpose of the air conditioning fail safe timer is to engage the air conditioning unit clutch if the prior steps have not been completed within a set maximum time. If the air conditioning fail safe timer has not exceeded the limit then the method goes to block 48. In block 56 the method engages the air conditioning unit clutch. Next, in block 58, the method initializes a rebound spark control timer, to prepare for the implementation of the rebound spark control method, as will be discussed in more detail below. Next, in block 60, the air conditioning unit fail safe timer is cleared. In block 62, the method stores a current throttle value for use in the adaptive clutch method as will be discussed in more detail below.

Next, in block 64, a snaptime is retrieved. The snaptime is the amount of time that the spark retard must be maintained, beyond the actuation of the air conditioning unit clutch before it is returned to zero. In the preferred embodiment the snap time is a function of the rotations per minute of the engine added to a value calculated by the adaptive clutch method. Next, in block 66 the snap time is decremented and in decision block 68 the method determines if the snap time is equal to zero. If the snap time is not equal to zero then the method goes to block 66. If the snap time is equal to zero then the method goes to block 70. In block 70, the method returns the spark retard to zero. Next, in block 72, the method calculates an additional momentary spark advance, denoted MBTADD, for those engines that are calibrated below Mean Best Torque for fuel efficiency or emissions reasons by using the current engine speed and manifold air pressure. In block 74, the method adds the MBTADD spark advance to the spark timing sequence. Next, in block 76, the method decrements the MBTADD spark advance by a ½°. In decision block 78, the method checks to see if the MBTADD spark advance is equal to zero. If the MBTADD spark advance is not equal to zero then the method goes to block 76. If the MBTADD spark advance is equal to zero then the method goes to block 80. In block 80, the method clears the memory location containing the MBTADD spark advance. Next, in block 82, the method ends the pre-engagement spark control methodology.

Figure 4:
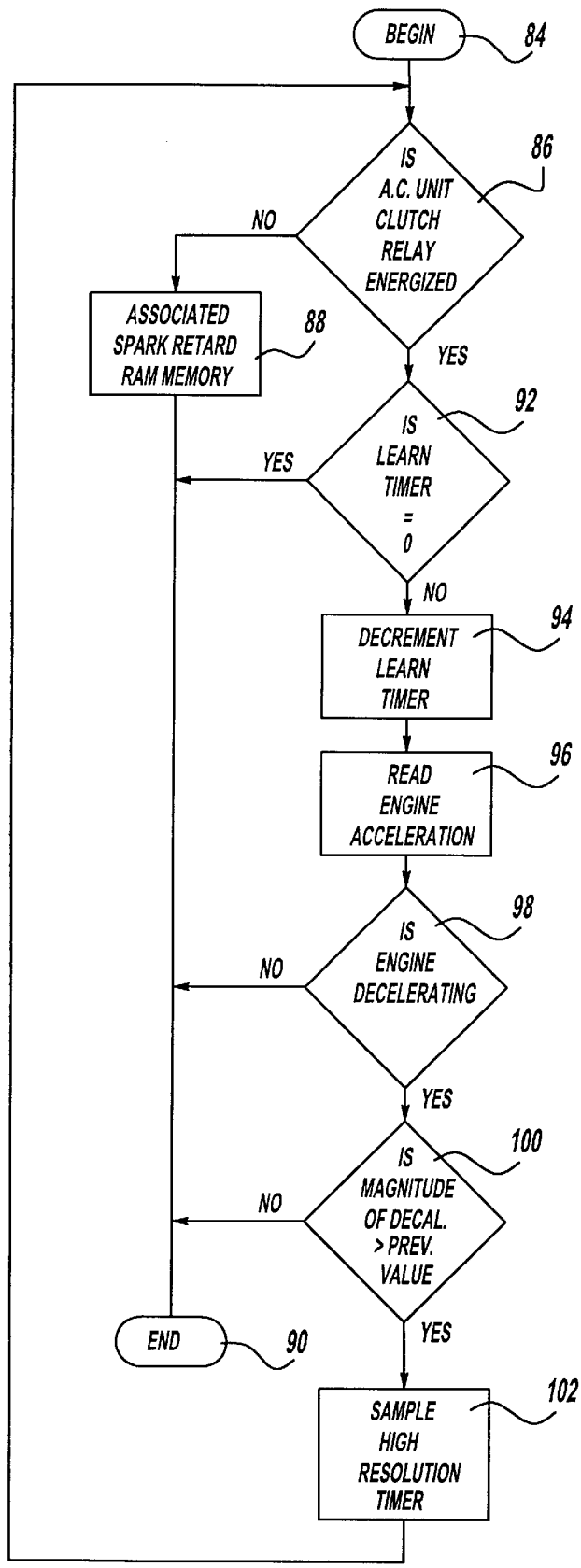
FIG. 4 is a flow chart illustrating a preferred embodiment of the adaptive clutch methodology of the present invention.

Referring to FIG. 4, a method is shown for an adaptive clutch. The method starts at bubble 84. Next, in block 86, the method determines if an air conditioning unit clutch relay is energized. If the air conditioning unit clutch relay is not energized then the method goes to block 88. At block 88, the ram memory of the engine controller that is associated with the adaptive clutch method is cleared and then the method goes to bubble 90 to end the adaptive clutch method. If the air conditioning unit clutch relay is energized then the method goes to decision block 92.

In decision block 92 the method determines if an air conditioning unit clutch gap learn timer is zero, where the air conditioner clutch gap learn timer is loaded with a non-zero value and is used to provide a maximum time limit for the execution of the adaptive clutch gap method. If the air conditioning unit clutch gap learn timer is zero then the method goes to bubble 90 to end the adaptive clutch method. If the air conditioning unit clutch gap learn timer is not zero then the method goes to block 94. In block 94, the method decrements the air conditioning unit clutch gap learn timer. Next, in block 96, the engine acceleration value is read by the method. Next, in decision block 98, the method checks to see if the engine is decelerating. If the engine is not decelerating then the method goes to bubble 90 to end the adaptive clutch gap method. If the engine is decelerating the method goes to decision block 100. In decision block 100, the magnitude of deceleration is checked against the previous magnitude of deceleration. If the present magnitude of deceleration is not greater than the previous magnitude of deceleration then the method goes to bubble 90, to end the adaptive clutch method. If the present magnitude of deceleration is greater than the previous magnitude of deceleration then the method goes to block 102. At block 102 the method samples a high resolution timer where the value of the high resolution timer represents the time between the actuation of the air conditioning unit clutch relay and the peak engine acceleration.

Figure 5A:
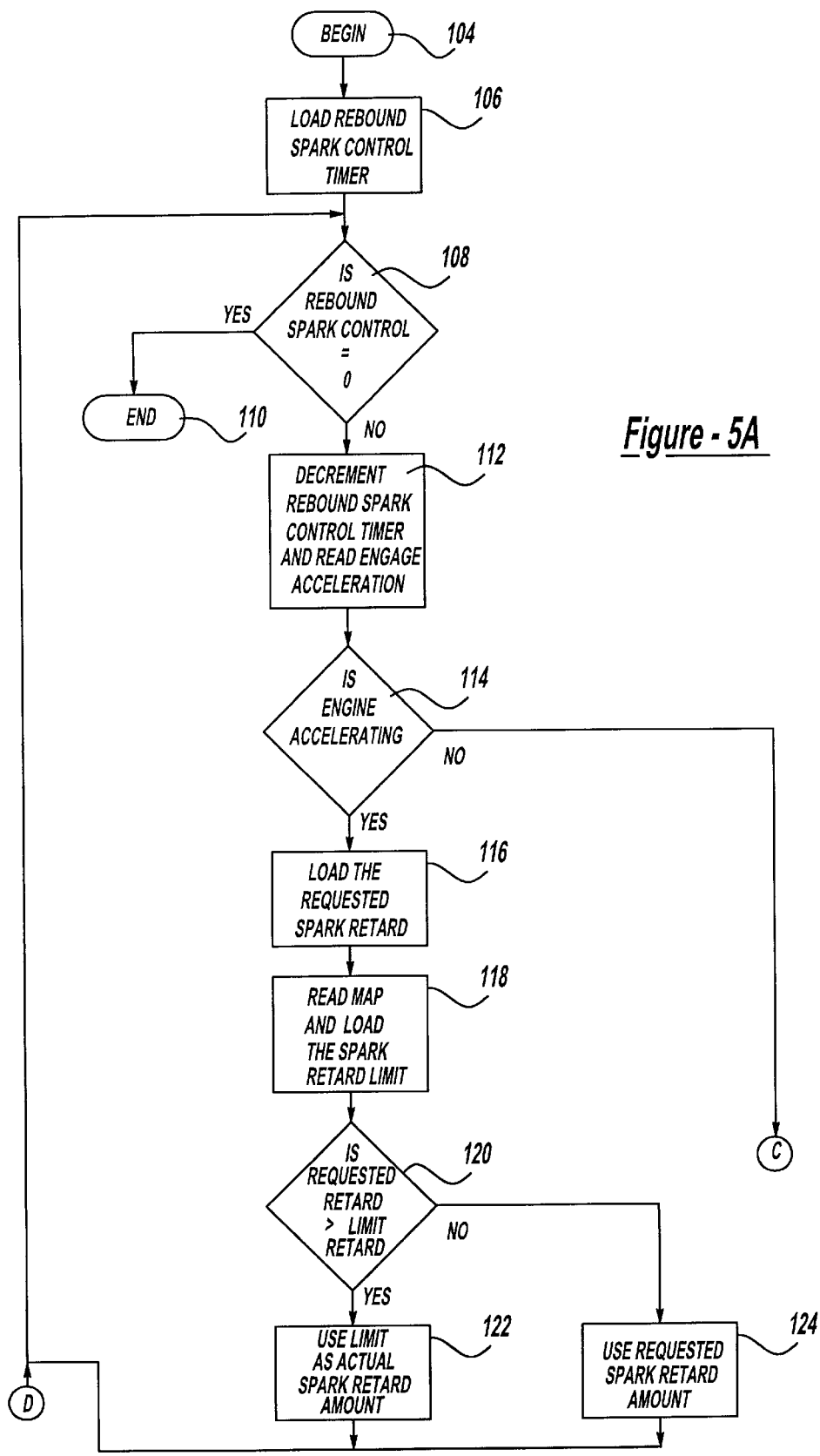
FIGS. 5a and 5b are flow charts illustrating a preferred embodiment of the rebound spark control methodology of the present invention.
Figure 5B:
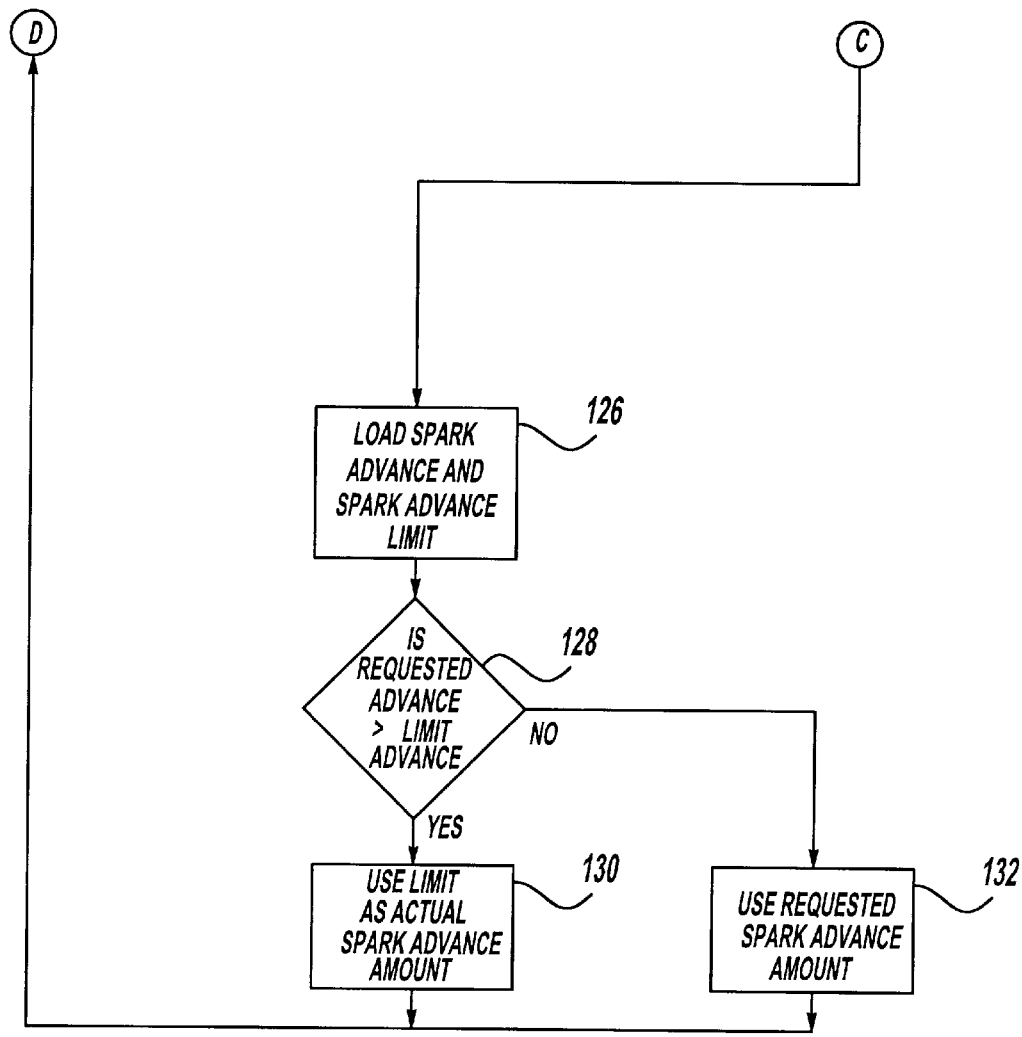

Referring to FIGS. 5*a* and 5*b*, a method is shown for rebound spark control. The method begins at bubble 104 when the air conditioning unit clutch has been engaged or disengaged. Next, in block 106, a non-zero value is loaded into a rebound timer. Next, in decision block 108, the method determines if the rebound spark control timer is equal to zero then the methodology is ended at bubble 110. If the rebound spark control timer is not equal to zero then the method proceeds to block 112. In block 112, the rebound spark control timer is decremented and an engine acceleration variable is read. Next, in decision block 114, the method checks if the engine acceleration variable is increasing. If the engine is accelerating then the method goes to block 116. In block 116 the requested spark retard, for retarding a spark start time for the spark plugs of the internal combustion engine, is obtained from a table of stored values where the amount of spark retard is a function of engine acceleration.

Next, in block 118, the engine manifold air pressure input value is read by the method and a spark retard limit value is obtained from a table of stored values, where the spark retard limit value is a function of the manifold air pressure. The decision block 120 checks the requested spark retard against a spark retard limit. If the requested spark retard is greater than the spark retard limit, then in step 122, the limit replaces the spark retard amount and proceeds to decision block 108. If the requested spark retard amount is less than the limit, then in block 124, the method utilizes the requested spark retard to modify the spark timing sequence for each spark plug of the internal combustion engine and proceeds to block 108. If, in decision block 114, the engine is decelerating then the method goes to block 126.

In block 126 a amount of spark advance, for advancing a spark start time for the spark plugs of the internal combustion engine is obtained from a table of stored values where the spark advance amount is a function of engine deceleration. Also in block 126, a spark advance limit value is obtained from a table of stored values, where the spark advance limit value is a function of the manifold air pressure. Next, in decision block 128, the method checks the requested spark advance against a spark advance limit. If the requested spark advance amount is greater than the spark advance limit, then in block 130, the spark advance limit replaces the spark advance amount and then proceeds to block 108. If the spark advance amount is less than the spark advance limit, then in block 132, the method will use the requested spark advance amount to modify the spark timing sequence for each spark plug of the internal combustion engine and proceed to block 108.

One skilled in the art will readily recognize from such discussion, and from the accompanying drawings and claims, that various changes, modifications and variations can be made therein without departing from the spirit and scope of the invention as defined in the following claims.

What is claimed is:

1. In a method for controlling the variation of loading on an internal combustion engine, the improvement comprising:

receiving a request to actuate a vehicle component;

modifying a spark timing sequence for each spark plug of the internal combustion engine;

actuating said vehicle component; and opposing a vehicle component torque generated by said actuation of said vehicle component with an adjustment of the internal combustion engine torque by reverting said modification of said spark timing sequence of each spark plug of the internal combustion engine.

2. A method as set forth in claim 1 wherein said step of modifying the spark timing sequence of each spark plug of the internal combustion engine comprises retarding a spark start time of the spark timing sequence of each spark plug of the internal combustion engine to a predetermined limit.

3. A method as set forth in claim 2 wherein said step of retarding the spark start time of the spark timing sequence of each spark plug of the internal combustion engine to a predetermined limit includes calculating the predetermined limit as a function of engine speed and manifold air pressure.

4. A method as set forth in claim 1 wherein said vehicle component is an air conditioning unit.

5. A method as set forth in claim 1 wherein said vehicle component is a power steering unit.

6. A method as set forth in claim 1 wherein said step of opposing torque includes reverting said modification of the spark timing sequence of each spark plug of the internal combustion engine to zero.

7. A method as set forth in claim 1 wherein said step of opposing said vehicle component torque includes reverting said modification of the spark timing sequence of each spark plug of the internal combustion engine such that a spark start time of the spark timing sequence is advanced to a predetermined limit.

8. A method as set forth in claim 1 including the step of calculating an adaptive clutch gap after said step of opposing said vehicle component torque.

9. A method as set forth in claim 8 wherein said step of calculating an adaptive clutch gap includes taking a measurement of the time between an actuation of said clutch and a peak deceleration of the engine.

10. In a method for controlling the variation of loading on an internal combustion engine, the improvement comprising:

receiving a request to actuate a vehicle component;

modifying a spark timing sequence for each spark plug of the internal combustion engine such that the spark timing sequence comprises retarding a spark start time for the spark plugs of the internal combustion engine to a predetermined limit that is a function of engine speed and manifold air pressure;

actuating said vehicle component;

opposing a vehicle component torque generated by said actuation of said vehicle component with an adjustment of the internal combustion engine torque by reverting said modification of said spark timing sequence of each spark plug of the internal combustion engine to zero; and calculating an adaptive clutch gap by taking a measurement of the time between an actuation of said clutch and a peak deceleration of the engine.

11. A method as set forth in claim 10 including the step of detecting a change in engine speed after said step of calculating an adaptive clutch gap.

12. A method as set forth in claim 11 including the step of reducing the change in engine speed through another modification of said spark timing sequence for each spark plug of the internal combustion engine after said step of detecting a change in engine speed.

13. A method as set forth in claim 12 wherein said step of reducing the change in engine speed comprises retarding a spark start time for the spark plugs of the internal combustion engine when the engine speed is increasing.

14. A method as set forth in claim 12 wherein said step of reducing the change in engine speed comprises advancing a spark start time for the spark plugs of the internal combustion engine when the engine speed is decreasing.

15. In a method for controlling the variation of loading on an internal combustion engine, the improvement comprising:

receiving a request to actuate a vehicle component;

modifying a spark timing sequence for each spark plug of the internal combustion engine such that the spark timing sequence comprises retarding a spark start time for the spark plugs of the internal combustion engine to a predetermined limit that is a function of engine speed and manifold air pressure;

actuating said vehicle component;

opposing a vehicle component torque generated by said actuation of said vehicle component with an adjustment of the internal combustion engine torque by reverting said modification of said spark timing sequence of each spark plug of the internal combustion engine to zero;

calculating an adaptive clutch gap by taking a measurement of the time between an actuation of said clutch and a peak deceleration of the engine;

detecting a change in engine speed; and reducing the change in engine speed through another modification of said spark timing sequence for each spark plug of the internal combustion engine.

* * * * *